Oct. 20, 1936. P. H. KUYPER Re. 20,133
VENETIAN BLIND CONSTRUCTION
Original Filed Jan. 15, 1934 2 Sheets-Sheet 1
Fig. 1.
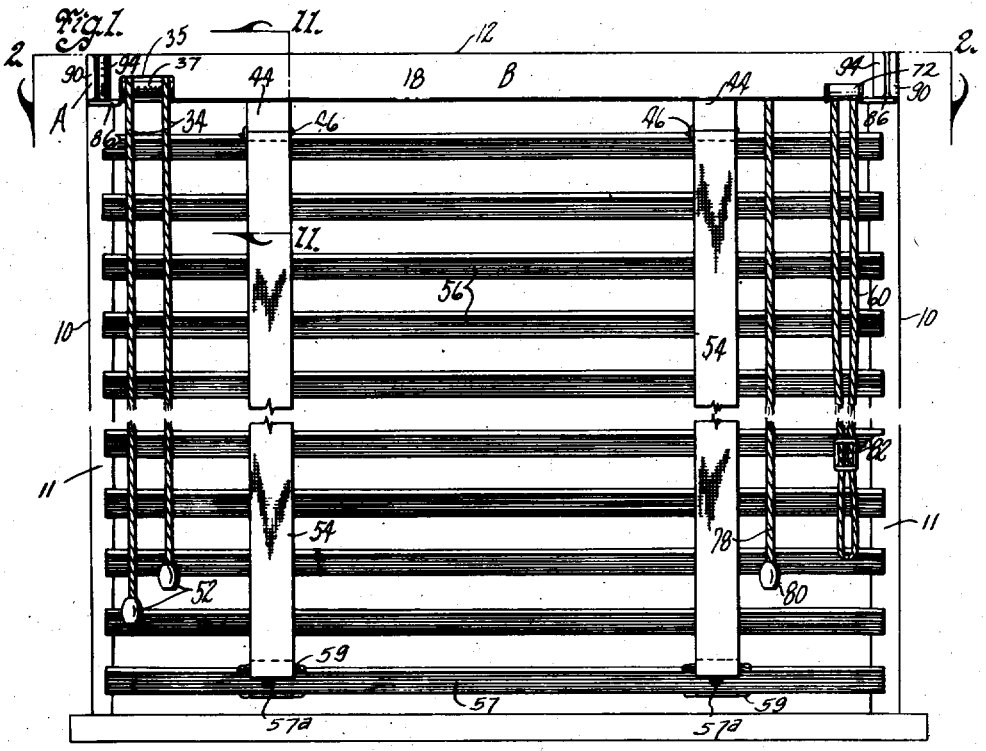
Fig. 11.
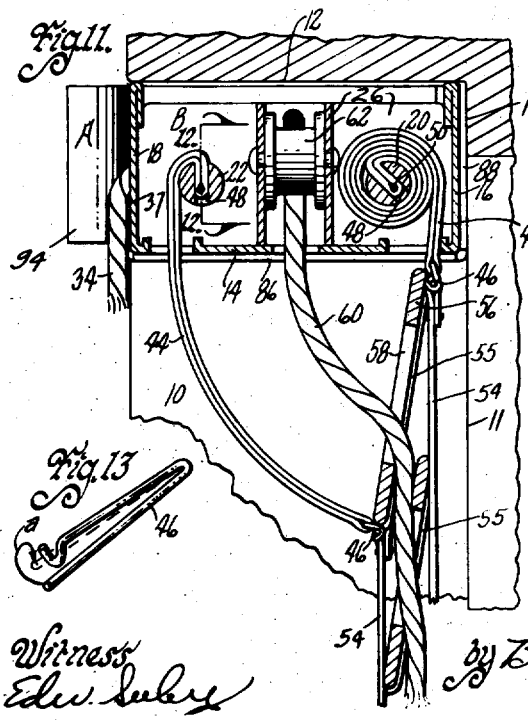
Fig. 10.
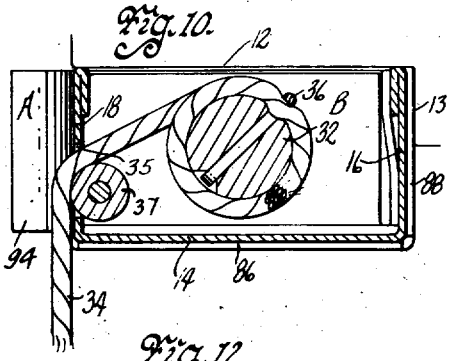
Fig. 12.
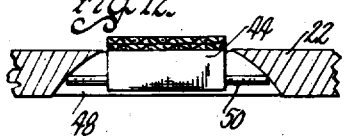
Fig. 13
Witness
Edw. Sulzy
Inventor
Peter H. Kuyper
by Bair, Freeman & Sinclair
Attorneys Oct. 20, 1936. P. H. KUYPER Re. 20,133
VENETIAN BLIND CONSTRUCTION
Original Filed Jan. 15, 1934 2 Sheets-Sheet 2
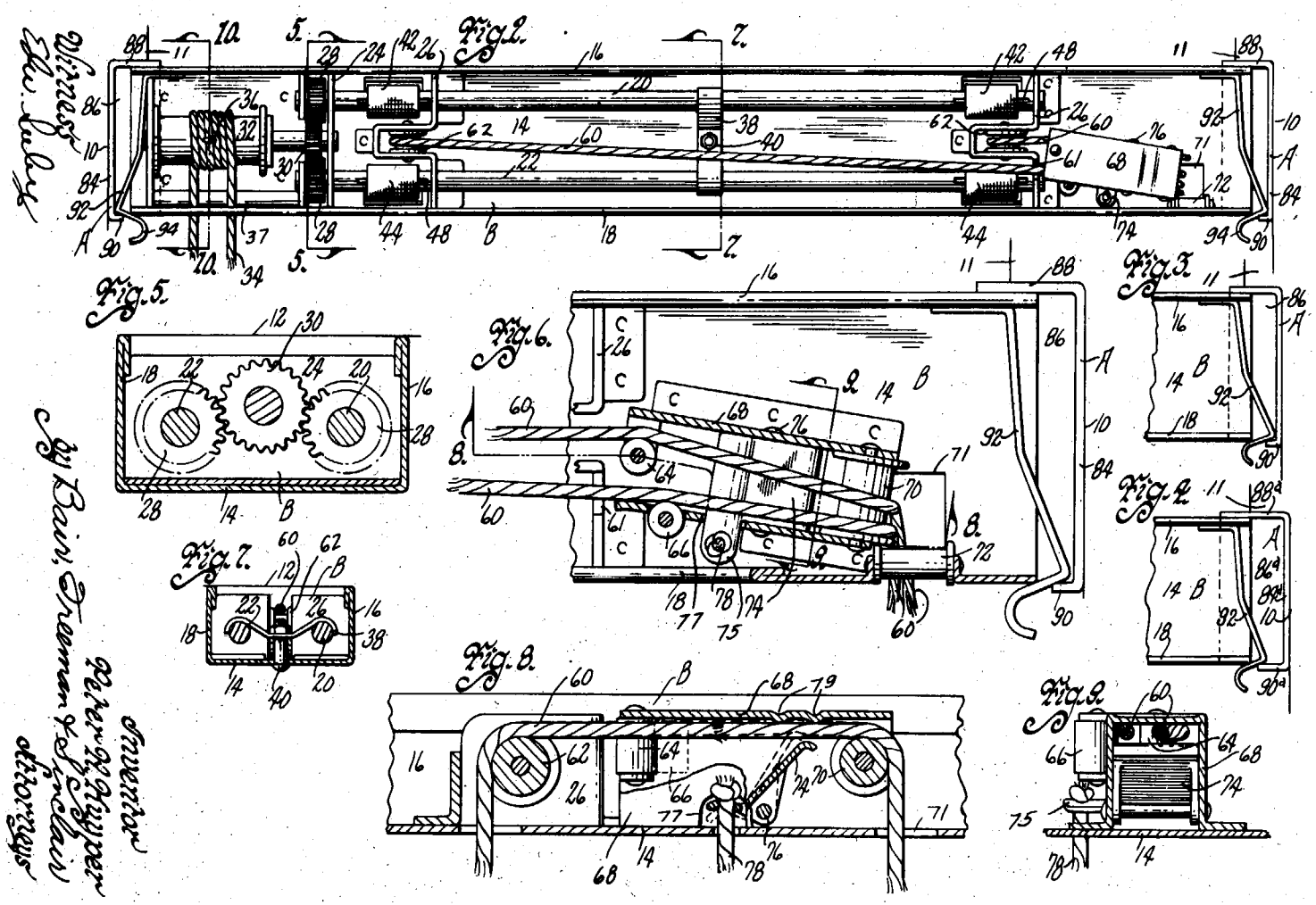

Reissued Oct. 20, 1936

Re. 20,133

UNITED STATES PATENT OFFICE 20,133

VENETIAN BLIND CONSTRUCTION

Peter H. Kuyper, Pella, Iowa, assignor to Rolscreen Company, Pella, Iowa, a corporation of Iowa Original No. 1,957,272, dated May 1, 1934, Serial No. 706,631, January 15, 1934. Application for reissue April 21, 1936, Serial No. 75,658

29 Claims. (Cl. 156—17)

The object of my invention is to provide a Venetian blind construction which is simple, durable and comparatively inexpensive to manufacture.

A further object is to provide a Venetian blind construction in which a sheet metal casing is removably associated with a window frame and supports a Venetian blind as well as its raising and tilting or adjusting mechanism, so that the casing can be readily removed for the purpose of cleaning or painting the blind, or cleaning, repairing or oiling the operating mechanism for the blind, the removable feature also being desirable so that blinds of different characteristics or color designs can be interchanged readily at will.

Still a further object is to provide casings which may be supplied by the manufacturer in successive lengths, for instance in one inch steps, and to provide supporting brackets of different sizes to compensate for fractions of an inch, whereby a blind of one length may accommodate window frame widths of any range within a quarter and an inch and a quarter greater than the length of the Venetian blind casing itself, thus facilitating installation and keeping the dealer's stock on hand to a minimum.

Still a further object is to provide a Venetian blind having a novel tipping mechanism comprising a pair of rotatable elements with the straps of a ladder tape wound thereon, one clockwise and the other counterclockwise, the tipping or adjusting control comprising means for simultaneously rotating the rotatable elements in the same direction so that one strap winds up while the other one unwinds.

Still a further object is to arrange the straps so that the speed of the one which winds up increases with respect to the speed of the one which unwinds so that the blind slats will be shifted toward the window when adjusting the slats to closed position, resulting in better closure of the slats with respect to the window and also with respect to each other, the latter result being due to the slats in their finally adjusted position and the entire Venetian blind itself being supported on one strap only.

A further object is to provide raising means for the Venetian blind having a novel locking arrangement to prevent lowering of the blind, the lock being in the form of a cam, a manual control being provided for the cam to lock it and it being movable to unlocked position by a slight raising of the blind.

A further object is to provide novel characteristics such as latches for the casing with respect to the brackets which support it, pulley arrangements for the raising ropes, a brake for the rotatable elements, a disconnecting means between the ladder tapes and the supporting casing and the like.

Still a further object is to provide a housing or casing adapted to completely house and conceal the operating mechanism of the Venetian blinds to protect them from accumulation of dust and dirt and at the same time to provide a head member that will be neat in appearance and lend itself to easy installation in a window opening.

Still a further object is to provide a head jamb assembly for a Venetian blind wherein the operating parts are compact within a housing and can be installed in a window opening as a unit.

A further object is the provision of a sheet metal box-like casing to house and conceal the operating hardware of a Venetian blind whereby the Venetian blind may be handled as a complete unit and installed without the use of additional wood trim or facie boards or false work.

A further object of my invention resides in the use of relatively large pulley wheels for the raising and lowering ropes without unduly increasing the overall height of the head rail casing that receives and supports all of the operating mechanism. The pulley wheels being so arranged with respect to the tilting mechanism that point of connection between the tape ladders and the tilting mechanism permits complete closing of the Venetian blind slats and at the same time the pulley wheels are centered between the sides of the tape ladders and the tape ladders move upwardly or downwardly on each side of the pulley wheels.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is an inside elevation of a Venetian blind structure embodying my invention.

Figure 2 is a plan view of the same on the indicating line 2—2 of Figure 1.

Figure 3 is a view similar to the right hand end of Figure 2 illustrating a different adjustment of the blind mechanism casing with respect to its supporting bracket.

Figure 4 is a similar view showing a different bracket.

Figure 5 is an enlarged sectional view on the line 5—5 of Figure 2.

Figure 6 is an enlarged plan view of the right hand end of Figure 2 showing part of the structure broken away and in section.

Figure 7 is a sectional view on the line 7—7 of Figure 2.

Figure 8 is a sectional view on the line 8—8 of Figure 6, showing a locking arrangement for the blind raising mechanism.

Figure 9 is a sectional view on the line 9—9 of Figure 6.

Figure 10 is an enlarged sectional view on the line 10—10 of Figure 2, showing an adjusting drum.

Figure 11 is an enlarged sectional view on the line 11—11 of Figure 1, showing the ladder tape supporting and adjusting mechanism.

Figure 12 is a detailed sectional view on the line 12—12 of Figure 11 showing a connection between one of the straps of the ladder tape and a rotatable element on which it is wound; and Figure 13 is a perspective view of a connecting device between the supporting casing and the ladder tapes of the Venetian blind.

On the accompanying drawings, I have used the reference numeral 10 to indicate the side jamb of a window frame. The head jamb thereof is indicated at 12. Brackets A are adapted for support with respect to the window frame and in turn support a Venetian blind mechanism casing B made of a single sheet of metal.

The casing B comprises a bottom wall 14, a back or outer wall 16 and a front or inner wall 18. The casing B is in the form of a channel and can be made of rather light weight sheet metal with sufficient rigidity arising out of its shape.

Within the casing 18, rotatable elements 20 and 22, such as rods or shafts, are journalled in transverse brackets 24 and 26. The brackets extend crosswise of the casing and can be sufficient in number to properly support the rotatable elements or the tilting mechanism. Each rotatable element 20 and 22 has thereon a pinion 28.

The pinions 28 mesh with a pinion 30 which is non-rotatably associated with a drum 32. A cord or other flexible element 34 has its center secured as by a cotter key 36 to the drum 32. The ends of the cord 34 depend from the drum after passing through a slot 35 and over a roller 37 and are provided on their lower ends with knobs 52. The knobs 52 are preferably of metal or other heavy material to maintain the cords taut and also to indicate by their comparative elevations which end of the cord is to be pulled downwardly in order to adjust the slats of the Venetian blind as desired.

The rods 20 and 22 may have a tendency to rotate too freely and to counteract this tendency I provide a brake means in the form of a strip of metal or the like 38 frictionally engaging the rotatable elements. To adjust the frictional effect of the strip 38, I provide a bolt 40 which can be tightened to increase the friction or loosened to decrease it in an obvious manner.

Wound on the rod 20 is a pair of doubled tapes 42 while wound on the rod 22 in an opposite direction is a pair of doubled tapes 44. The tapes 42 and 44 are adapted to support straps 54 of a ladder tape, the rungs of which are indicated at 55. The tapes 42 and 44 are connected with looped upper ends of the straps 54 by fasteners 46, such as shown in Figure 13, which can be inserted in the looped upper ends of the straps and through the looped tapes 42 and 44 and then fastened together by adjustment to the dotted line position of Figure 13 as indicated by the arrow *a*.

The particular arrangement of the doubled straps 42 and 44 (which however can be single with looped ends if desired) accomplishes a very desirable result, especially when associated with the adjusting rods 20 and 22 as disclosed. When the slats 56 are adjusted to their closed position as shown in Figure 11, the rod 22 is unwound and the rod 20 is wound, both at the same speed. The diameter of the tape 44 on the rod 22, however, decreases, while the diameter of the tape 42 on the rod 20 increases so that in the final position, the right hand tape 42 only is supported and supports the strap 54, the rungs 55, the slats 56 and the ropes 60. This places the slats 56 in the closest possible overlapping position—that is, as close as the ropes 60 between them will permit, as is obvious by a minute inspection of Figure 11.

Furthermore, it will be noted that the entire blind is supported under the rod 20 rather than in a central position below the rods 20 and 22, thus placing the slats 56 as near as possible to the portion 11 of the window frame, which portion is usually in the form of a flange surrounding the window itself, the numeral 13 indicating a similar flange at the head of the window.

The tapes 42 and 44 themselves are secured to the rods 20 and 22 by pins 50 (see Figure 12) drawn into slots 48 formed in the rods.

The Venetian blind itself includes a plurality of slats 56 made of wood or the like in the ordinary manner and having slots 58 for raising ropes 60 to extend through. The lower slat, indicated at 57, I prefer to make of metal so that it has the same thickness as the lighter slats 56, yet has greater weight so as to keep the blind in taut position when it is lowered without providing an unsightly much thicker bar as would be necessary when making it of wood.

The ropes 60 have their lower ends secured to the metal slat 57 as at 57*a* and extend upwardly through the slots 58 of the successive slats 56. The ropes then extend over pulleys 62 and then around pulleys 64 and 66. The pulleys 64 and 66 are housed in a channel-shaped bracket 68 in which is also journaled a pulley 70. The ropes 60 extend over the pulley 70 and then downwardly through an opening 71 in the bottom 14 of the casing B.

A pulley 72 is provided under which the ropes 60 may be swung outwardly from the window frame when raising the Venetian blind without unduly chafing the ropes or causing them to jump off the pulley 70.

The right hand bracket 26 is provided with a notch 61 for one of the ropes to extend through before it reaches the pulley 66.

While I have shown two tape ladders 54 on the drawings, it will be understood, however, that any number more than two can be used. The use of a housing or casing made of sheet metal with a tilting mechanism therein that can have as many bearings as necessary enables me to make a Venetian blind of great width, yet properly supported without danger of sagging. The tilting mechanism, it will be noted, has a bearing closely adjacent the point of attachment of the tape ladders to the tilting mechanism, thus permitting a small diameter rod to be used as the tilting mechanism. The rod need be strong enough to rotate as a result of rotation imparted at one of its ends. Its load supporting strength due to the bearings adjacent the tape ladders can be reduced to the very minimum.

I provide a novel locking means for the raising ropes 60 in the form of a cam 74 pivoted at 76 (see Figure 8) and having an arm 75 extended through a notch 77. The blind can be adjusted by the ropes 60 to any desired position and a rope 78 attached to the arm 75 may then be pulled downwardly to swing the locking cam to its dotted line position, thereby forcing its upper end against the ropes 60 and confining the ropes between the cam and locking grooves 79 formed in the bracket 68. The ropes 60 may then be released and the weight of the blind will tend to keep the cam 74 engaged.

Subsequently, whenever it is desired to either raise or lower the blind, the ropes 60 may be pulled which will unlock the cam and may then be further pulled for raising the blind or slackened to lower it.

On the locking rope 78, I provide a weighted knob 80 while on the ropes 60 I provide a rectangular buckle-like element 82 having a cross bar so that the ropes 60 may be adjusted relative thereto to facilitate equal draft on the ropes 60 when raising the blind and thereby keeping its lower end level.

The brackets A comprise webs 84 which may be secured by screws or the like to the side jambs 10 or may be secured to the head jamb 12 if desired adjacent its ends. Each bracket A has a supporting flange 86 on which the ends of the casing B rest. A back flange 88 is provided to limit outward movement of the casing B when it is inserted past inner flanges 90. The flanges 90 are provided for spring latches 92 to snap behind when the casing is in supported position.

Finger engaging portions 94 are provided on the latches 92 which can be pulled toward each other when it is desired to remove the casing B from its supported position on the flanges 86.

In Figure 2, the casing B is shown supported between side jambs 10 which are as close together as this length of casing will permit and yet allow room between the ends of the front wall 18 and the flanges 90 for the latches 92 to pass when installing or removing the casing B.

In Figure 3 I have shown the same bracket A in a window frame of slightly greater width. The spring latches 92 take up the difference and close the space between the flanges 90 and the ends of the front wall 18 as clearly shown. Also the resiliency of the latches 92 tends to center the casing B with respect to the brackets A supporting its ends.

In Figure 4, I have shown the same casing B installed in a still wider window frame, a bracket A being provided in this case. It is similar to the bracket A except that the flanges indicated at 86*a*, 88*a* and 90*a* are wider. Thus, it will be obvious that a range of dimensions over an inch or so can be taken care of by a casing of one length and brackets of different sizes.

When interchanging, cleaning, painting, oiling or the like, it will be obvious that my construction facilitates any of the operations mentioned. The casing and therefore the entire blind structure is removable from the supporting brackets A and can be placed on a work bench where the parts of the blind are much easier to get at than when trying to perform any operations on them while in installed position.

The various features disclosed go to make up a very efficiently operable blind and one which has many novel features.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a Venetian blind structure, a pair of rotatable elements, a tape ladder, one strap thereof being wound on one of said rotatable elements and the other strap thereof being wound on the other of said rotatable elements and means for rotating said rotatable elements.

2. In a Venetian blind structure, a pair of rotatable elements, a tape ladder, one strap thereof being wound on one of said rotatable elements and the other strap thereof being wound on the other of said rotatable elements and means for simultaneously rotating said rotatable elements.

3. In a Venetian blind structure, a pair of rotatable elements, a tape ladder, one strap thereof being wound on one of said rotatable elements and the other strap thereof being wound on the other of said rotatable elements and means for rotating said rotatable elements, said means comprising a drum geared to said rotatable elements and a flexible element having its center wound on said drum and its ends depending therefrom.

4. In a Venetian blind structure, a pair of rotatable elements, a tape ladder, one strap thereof being wound clockwise on one of said rotatable elements and the other strap thereof being wound counterclockwise on the other of said rotatable elements and means for simultaneously rotating said rotatable elements in the same direction.

5. In a Venetian blind structure, a casing, a pair of rotatable elements therein, a tape wound on each rotatable element, a tape ladder, the straps thereof being respectively detachably connected with said first mentioned tapes and means for rotating said rotatable elements.

6. In a Venetian blind structure, a rotatable element, a ladder tape having a strap wound thereon, said rotatable element having a slot, said strap having a loop extending through said slot and a pin through said loop.

7. In a Venetian blind structure, a rotatable element, a ladder tape having a strap wound thereon, said rotatable element having a V-shaped slot, said strap having a loop extending through said slot and a pin through said loop and drawn into said slot.

8. In a Venetian blind structure, a pair of rotatable elements, supporting tapes, one tape being wound on one of said rotatable elements and the other tape being wound on the other of said rotatable elements and means for rotating said rotatable elements.

9. A Venetian blind comprising a support in the form of a housing, means carried by the support and concealed therein for suspending a Venetian blind therefrom, said means being adjustable for varying the angle of inclination of the Venetian blind as and for the purposes stated.

10. In a Venetian blind structure, a pair of rotatable elements, supporting tapes, one tape being wound on one of said rotatable elements and the other tape being wound on the other of said rotatable elements and means for rotating said rotatable elements for winding one tape and unwinding the other one.

11. A Venetian blind comprising a support in the form of a housing, means carried by the support and concealed therein for suspending a Venetian blind therefrom, said means comprising a pair of rotatable elements, supporting tapes, one tape being wound on one of said rotatable elements and the other tape being wound on the other of said rotatable elements and means for rotating said rotatable elements.

12. A Venetian blind comprising a support in the form of a housing, means carried by the support and concealed therein for suspending a Venetian blind therefrom, said means comprising a pair of rotatable elements, supporting tapes, one tape being wound clockwise on one of said rotatable elements and the other tape being wound counterclockwise on the other of said rotatable elements and means for rotating said rotatable elements in the same direction.

13. An all metal Venetian blind head construction for receiving, supporting and concealing the operating mechanism of a blind having raising ropes, said construction comprising a sheet metal casing, bent to form an upwardly opening channel shaped housing and support, a shaft carried upon the bottom of said channel shaped housing and support and concealed between the walls thereof, plural bearing members for said shaft, said housing having plural pairs of spaced openings in its bottom through which Venetian blind tape ladders may extend for connection with said shaft, to cause movement of one side of the tape ladders in one direction while the other side moves in an opposite direction, means supported within said housing adjacent and between the openings of each pair of spaced openings for guiding the raising ropes of the Venetian blind and locking means for the Venetian blind within the housing and support whereby the head construction may have the uppermost slat of the blind abut against the outer side of the bottom of the housing and support when the slats are fully retracted and may have one edge of the uppermost slat engage the bottom of the housing and support when the slats are in their lowered, closed position.

14. For use with a Venetian blind head bar structure including an initially flat elongated sheet of metal bent to form at least a bottom and a pair of upwardly extending side walls forming a casing, said bottom having a plurality of openings through which the raising ropes of a Venetian blind extend into the casing, pulleys above said bottom wall and between said side walls over which said raising ropes extend, said raising ropes after extending over said pulleys, depending from said bottom wall through one of said openings; rope locking means above said bottom wall between said side walls for retaining said rope against retrograde movement while leaving the under side of said bottom substantially free of obstruction for causing the uppermost slat of the Venetian blind to abut against the underside of said bottom when the slats are fully retracted.

15. For use with a Venetian blind structure comprising a Venetian blind including raising ropes, tape ladders and a plurality of identically similar slats and a three sided sheet metal casing having an open top, said casing being adapted for positioning against the underside of a window head jamb, said casing to be closed thereby and having an opening for each rope and for each side tape of said tape ladders, said ropes and tapes extending through said openings and into said casing; means supported and concealed within said casing for connection with said tapes and for relatively adjusting them and for said ropes retracted to various degrees and control elements for the ropes and tapes depending from said casing.

16. For use with a Venetian blind structure comprising a Venetian blind including raising ropes, tape ladders and a plurality of identically similar slats and a three sided sheet metal casing having an open top, said casing being adapted for positioning against the underside of a window head jamb, said casing to be closed thereby and having an opening for each rope and for each side tape of said tape ladders; said ropes and tapes extending through said openings and into said casing, winding and unwinding means supported and concealed within said casing for connection with said tapes and for relatively adjusting them and holding means supported and concealed within said casing to retain said ropes retracted to various degrees and control elements for the ropes and tapes depending from said casing.

17. For use with an all metal Venetian blind head unit construction for receiving, supporting, and concealing the operating mechanism of a Venetian blind having slats, tape ladders and raising ropes, said head unit construction being of the type comprising a sheet metal casing bent to form an upwardly opening, channel shaped housing and support, said housing and support having plural pairs of spaced openings in its bottom through which the tape ladders may vertically extend and other openings through which said raising ropes may vertically extend and having means supported within said housing for guiding the raising ropes; and locking means for said raising ropes supported within the housing whereby the uppermost slat of the blind may be retained in abutment against the outer side of the bottom of the housing and support when the slats are fully retracted and said uppermost slat may have one edge engage the outer side of the bottom of the housing when the slats are in closed lowered position.

18. For use with a Venetian blind, a unit complete in itself and comprising an all metal hollow head bar having pairs of spaced openings in its bottom to receive the tapes of tape ladders and openings to receive the raising ropes of a Venetian blind, mechanism within said head bar for operatively supporting said tapes and ropes, said mechanism comprising rotary shaft means, and locking means for holding said ropes against retrograde movement, journals for said shaft means located closely adjacent said pairs of openings, means of connection between the tapes of said tape ladders and said shaft means, the Venetian blind being supported from the shaft at points in close proximity to the journals for said shaft means; a control element depending from said head bar and gearing within said head bar, said gearing constituting an operative connection between said control element and said shaft means for imparting rotation to said shaft means upon adjustment of said element.

19. For use with a Venetian blind supporting and operating structure comprising a casing-like hollow head bar for supporting the operating mechanism of a Venetian blind, said mechanism being received therein and thereby concealed and comprising shaft means, shaft operating means, raising rope pulleys and raising rope locking means; a control element for said shaft operating means, said head bar having an opening through which said control element extends from said shaft operating means to a point of access exterior of said head bar, said head bar having pairs of openings for tapes of the tape ladders of a Venetian blind to extend through for winding and unwinding relationship with said shaft means and having other openings to receive the raising ropes of a Venetian blind, said other openings being located adjacent said raising rope pulleys, such ropes extending through said raising rope locking means and depending therefrom to a point of access exterior of said head bar.

20. For use with a Venetian blind supporting and operating structure including a casing-like hollow head bar for supporting the operating mechanism of a Venetian blind, said mechanism being received therein and thereby concealed and said head bar having raising rope pulleys and openings to receive the raising ropes of a Venetian blind and located adjacent said raising rope pulleys, the uppermost slat of the Venetian blind being engageable either flatwise when the blind is fully retracted or edgewise when it is extended and closed against the bottom wall of said head bar; rope locking means within said head bar such ropes extending through said raising rope locking means and depending therefrom, the raising ropes being operable to cause said uppermost slat to engage flatwise against said bottom wall and said rope locking means operable to releasably retain it in such position.

21. A Venetian blind supporting and operating structure comprising an all metal head unit casing for supporting the operating mechanism of a Venetian blind, said mechanism being received therein and thereby concealed and comprising tilting means and raising ropes for a Venetian blind, said casing having openings through which the tapes of the tape ladders and said raising ropes of the Venetian blind extend, the uppermost slat of the Venetian blind being engageable against the bottom wall of said casing either flatwise when the blind is fully retracted or edgewise when it is extended and closed, said raising ropes being operable to cause said flatwise engagement of said uppermost slat with said casing bottom and said tilting means being operable to cause said edgewise engagement of said uppermost slat with said casing bottom for eliminating light lines between the blind and casing in both the fully retracted and extended closed positions of the blind.

22. A Venetian blind device comprising an all metal head unit comprising, a casing for receiving, supporting and concealing the operating mechanism therein, tape ladders projecting up into said casing and depending therefrom for carrying slats, the uppermost slat adapted to abut against the underside of said casing when fully retracted and adapted to have one edge engage the underside of the casing adjacent one side strap of said tape ladders for eliminating a light line between said head unit casing and said slats when the slats are in either fully retracted or closed position.

23. A Venetian blind device comprising a sheet metal casing having at least a bottom and a pair of upstanding side walls for receiving, supporting and concealing therein the operating and supporting means of Venetian blind slats, tape ladders for the slats extending through the bottom and connected to said operating and supporting means, the uppermost slat being slightly spaced from the bottom of the casing to cause either edge of said slat to engage said bottom near either edge thereof when the uppermost slat is in one of its closed positions.

24. A Venetian blind device comprising a sheet metal casing having at least a bottom and a pair of upstanding side walls for receiving, supporting and concealing the operating and supporting means of Venetian blind slats therein, tape ladders for the slats extending through the bottom and connected to said operating and supporting means, the uppermost slat being slightly spaced from the bottom of the casing to permit either edge of said slat to engage said bottom near either edge thereof when the uppermost slat is in one of its closed positions, said uppermost slat when the slats are fully retracted, engaging flatwise against said bottom for eliminating a light line between the casing and the slats.

25. In a Venetian blind head bar structure, an initially flat elongated sheet of metal bent to form a casing having at least a bottom and a pair of upwardly extending side walls, said bottom having a plurality of openings through which the tapes of the tape ladders extend and openings through which the raising ropes of a Venetian blind extend into the casing, rotary means carried by said bottom, spaced thereabove and between said side walls for simultaneouslyy retracting one side and extending the other side of each tape ladder with respect to said casing, pulleys above said bottom wall and between the openings through which said tapes extend, raising ropes extending over said pulleys and depending from said housings through one of said openings.

26. An all metal Venetian blind head unit construction for receiving, supporting and concealing the operating mechanism of a blind having slats, tape ladders and raising ropes, said head unit construction comprising a sheet metal casing bent to form an upwardly opening, channel shaped housing and support, a shaft carried by said housing and concealed between the walls thereof, bearing members for said shaft spaced inwardly from the ends thereof, said housing having spaced openings in its bottom through which the tape ladders may vertically extend and having other openings through which the raising ropes may vertically extend, means of connection between points spaced from the axis of said shaft and said tape ladders to cause movement of one side of the tape ladders upwardly while the other side simultaneously therewith moves downwardly and means supported within said housing for guiding the raising ropes.

27. An all metal Venetian blind head unit construction for receiving, supporting and concealing the operating mechanism of a blind having slats, tape ladders and raising ropes, said head unit construction comprising a sheet metal casing bent to form an upwardly opening, channel shaped housing and support, a shaft carried by said housing and concealed between the walls thereof, bearing members for said shaft spaced inwardly from the ends thereof, said housing having spaced openings in its bottom through which the tape ladders may vertically extend and having other openings through which the raising ropes may vertically extend, quickly detachable means of connection between points spaced from the axis of said shaft and said tape ladders to cause movement of one side of the tape ladders upwardly while the other side simultaneously therewith moves downwardly and means supported within said housing for guiding the raising ropes.

28. A Venetian blind supporting and operating structure comprising a casing-like hollow head bar for supporting the operating mechanism of a Venetian blind, said mechanism being received therein and thereby concealed and comprising shaft means, shaft operating means, raising rope pulleys, a control element for said shaft operating means, said head bar having pairs of openings for tapes of the tape ladders of a Venetian blind to extend through, said tapes being operatively connected with said shaft means for simultaneous retraction of one tape and extension of the other tape relative to the shaft means and having other openings to receive the raising ropes of a Venetian blind, said other openings being located adjacent said raising rope pulleys, such ropes extending through said raising rope pulleys and depending from said head bar, the uppermost slat of the Venetian blind being engageable either flatwise when the blind is fully retracted or edgewise when it is extended and closed against said head bar, and said control element through said shaft means being operable to cause said slat to engage edgewise against said head bar.

29. In a Venetian blind structure, an all metal head construction comprising a channel shaped casing having its ends open and said ends adapted to be closed by supporting brackets when the casing is positioned therein, shaft elements within said casing arranged longitudinally thereof and concealed thereby, plural bearings for each of said shaft elements located intermediate the ends thereof, tape ladders extending up into said casing for supporting Venetian blind slats, said tape ladders having one side thereof secured to one shaft element and the other side thereof secured to the other shaft element whereby rotation of said shaft elements will cause one side of the tape ladders to move into said casing and the other side to extend outwardly therefrom for adjusting the Venetian blind slats to any angle of adjustment and raising means for bundling the slats comprising pulley wheels within said casing and positioned midway between said shaft elements over which an operating cord extends as and for the purposes stated.

PETER H. KUYPER.

DISCLAIMER

Re. 20,133.—*Peter H. Kuyper*, Pella, Iowa. VENETIAN BLIND CONSTRUCTION. Patent dated October 20, 1936. Disclaimer filed October 28, 1938, by the assignee, *Rolscreen Company*.

Hereby enters this disclaimer to claim 9 of said specification.

[*Official Gazette November 22, 1938.*]

therein and thereby concealed and comprising shaft means, shaft operating means, raising rope pulleys, a control element for said shaft operating means, said head bar having pairs of openings for tapes of the tape ladders of a Venetian blind to extend through, said tapes being operatively connected with said shaft means for simultaneous retraction of one tape and extension of the other tape relative to the shaft means and having other openings to receive the raising ropes of a Venetian blind, said other openings being located adjacent said raising rope pulleys, such ropes extending through said raising rope pulleys and depending from said head bar, the uppermost slat of the Venetian blind being engageable either flatwise when the blind is fully retracted or edgewise when it is extended and closed against said head bar, and said control element through said shaft means being operable to cause said slat to engage edgewise against said head bar.

29. In a Venetian blind structure, an all metal head construction comprising a channel shaped casing having its ends open and said ends adapted to be closed by supporting brackets when the casing is positioned therein, shaft elements within said casing arranged longitudinally thereof and concealed thereby, plural bearings for each of said shaft elements located intermediate the ends thereof, tape ladders extending up into said casing for supporting Venetian blind slats, said tape ladders having one side thereof secured to one shaft element and the other side thereof secured to the other shaft element whereby rotation of said shaft elements will cause one side of the tape ladders to move into said casing and the other side to extend outwardly therefrom for adjusting the Venetian blind slats to any angle of adjustment and raising means for bundling the slats comprising pulley wheels within said casing and positioned midway between said shaft elements over which an operating cord extends as and for the purposes stated.

PETER H. KUYPER.

DISCLAIMER

Re. 20,133.—*Peter H. Kuyper*, Pella, Iowa. VENETIAN BLIND CONSTRUCTION. Patent dated October 20, 1936. Disclaimer filed October 28, 1938, by the assignee, *Rolscreen Company*.

Hereby enters this disclaimer to claim 9 of said specification.

[*Official Gazette November 22, 1938.*]